United States Patent
Skekloff et al.

(10) Patent No.: US 8,031,047 B2
(45) Date of Patent: *Oct. 4, 2011

(54) TRAINABLE TRANSCEIVER

(75) Inventors: Jon M. Skekloff, Holland, MI (US); Garry L. Krouse, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1080 days.

This patent is subject to a terminal disclaimer.

(21) Appl. No.: 11/752,138

(22) Filed: May 22, 2007

(65) Prior Publication Data

US 2007/0279186 A1    Dec. 6, 2007

Related U.S. Application Data

(63) Continuation of application No. 10/898,895, filed on Jul. 26, 2004, now Pat. No. 7,221,256, which is a continuation-in-part of application No. 08/859,130, filed on May 20, 1997, now abandoned, and a continuation-in-part of application No. PCT/US03/38570, filed on Dec. 4, 2003.

(60) Provisional application No. 60/431,099, filed on Dec. 5, 2002.

(51) Int. Cl.
*G08C 17/00* (2006.01)

(52) U.S. Cl. ............... 340/5.61; 340/5.72; 340/5.22

(58) Field of Classification Search ............... 340/5.61, 340/5.72, 5.22, 5.62, 5.63, 5.64, 5.65, 825.22, 340/426.36, 426.13, 426.14, 426.15, 426.16, 340/426.17, 825.69, 12.23, 12.28, 13.25; 341/176

See application file for complete search history.

(56) References Cited

U.S. PATENT DOCUMENTS

| 3,824,469 | A | 7/1974 | Ristenbatt |
| 4,241,870 | A | 12/1980 | Marcus |
| 4,247,850 | A | 1/1981 | Marcus |
| 4,260,983 | A | 4/1981 | Falck et al. |
| 4,353,064 | A | 10/1982 | Stamm |
| 4,399,437 | A | 8/1983 | Falck et al. |
| 4,447,808 | A | 5/1984 | Marcus |
| 4,476,469 | A | 10/1984 | Lander |
| 4,514,731 | A | 4/1985 | Falck et al. |
| 4,595,228 | A | 6/1986 | Chu |
| 4,688,026 | A | 8/1987 | Scribner et al. |
| 4,712,103 | A | 12/1987 | Gotanda |

(Continued)

FOREIGN PATENT DOCUMENTS

EP    1 216 900 A1    6/2002

(Continued)

OTHER PUBLICATIONS

U.S. Appl. No. 08/690,461, filed Jul. 26, 1996, Dykema et al.

(Continued)

*Primary Examiner* — Edwin Holloway, III

(74) *Attorney, Agent, or Firm* — Foley & Lardner LLP

(57) ABSTRACT

A wireless control system for a vehicle includes a controller provided in a vehicle for controlling a vehicle component in response to a first signal transmitted from a first transmitter and a transceiver provided in the vehicle for receiving a second signal from a second transmitter. The second signal differs from the first signal. The transceiver is configured to transmit a third signal to the controller in response to the second signal, the third signal emulating at least a portion of the first signal.

30 Claims, 2 Drawing Sheets

U.S. PATENT DOCUMENTS

| | | | |
|---|---|---|---|
| 4,754,255 A | 6/1988 | Sanders et al. | |
| 4,922,261 A | 5/1990 | O'Farrell | |
| 5,049,867 A | 9/1991 | Stouffer | |
| 5,227,779 A | 7/1993 | Falck | |
| 5,227,780 A * | 7/1993 | Tigwell | 340/825.72 |
| 5,310,999 A | 5/1994 | Claus et al. | |
| 5,317,309 A | 5/1994 | Vercellotti et al. | |
| 5,319,364 A | 6/1994 | Waraksa et al. | |
| 5,351,187 A | 9/1994 | Hassett | |
| 5,379,453 A | 1/1995 | Tigwell | |
| 5,442,340 A | 8/1995 | Dykema | |
| 5,475,366 A | 12/1995 | Van Lente et al. | |
| 5,479,155 A | 12/1995 | Zeinstra et al. | |
| 5,479,157 A | 12/1995 | Suman et al. | |
| 5,525,977 A | 6/1996 | Suman | |
| 5,555,172 A | 9/1996 | Potter | |
| 5,564,101 A | 10/1996 | Eisfeld et al. | |
| 5,583,485 A | 12/1996 | Van Lente et al. | |
| 5,614,885 A | 3/1997 | Van Lente et al. | |
| 5,614,891 A | 3/1997 | Zeinstra et al. | |
| 5,619,190 A | 4/1997 | Duckworth et al. | |
| 5,627,529 A | 5/1997 | Duckworth et al. | |
| 5,646,701 A | 7/1997 | Duckworth et al. | |
| 5,650,774 A | 7/1997 | Drori | |
| 5,661,651 A | 8/1997 | Geschke et al. | |
| 5,661,804 A | 8/1997 | Dykema et al. | |
| 5,680,134 A * | 10/1997 | Tsui | 341/173 |
| 5,680,263 A | 10/1997 | Zimmermann et al. | |
| 5,686,903 A | 11/1997 | Duckworth et al. | |
| 5,699,054 A | 12/1997 | Duckworth | |
| 5,699,055 A | 12/1997 | Dykema et al. | |
| 5,777,903 A | 7/1998 | Piosenka et al. | |
| 5,793,300 A | 8/1998 | Suman et al. | |
| 5,838,255 A | 11/1998 | Di Croce | |
| 5,850,188 A | 12/1998 | Doyle et al. | |
| 5,854,593 A | 12/1998 | Dykema et al. | |
| 5,903,226 A | 5/1999 | Suman et al. | |
| 5,940,510 A | 8/1999 | Curry et al. | |
| 5,988,510 A | 11/1999 | Tuttle et al. | |
| 6,028,537 A | 2/2000 | Suman et al. | |
| 6,031,465 A | 2/2000 | Burgess | |
| 7,221,256 B2 | 5/2007 | Skekloff et al. | |
| 7,257,426 B1 | 8/2007 | Witkowski et al. | |
| 7,269,416 B2 | 9/2007 | Guthrie et al. | |
| 7,346,374 B2 | 3/2008 | Witkowski et al. | |
| 7,349,722 B2 | 3/2008 | Witkowski et al. | |
| 2002/0130765 A1 | 9/2002 | Flick | |

FOREIGN PATENT DOCUMENTS

| | | |
|---|---|---|
| GB | 2 325 552 A | 11/1998 |
| WO | WO 94/02920 A1 | 2/1994 |
| WO | WO 01/08115 A1 | 2/2001 |
| WO | WO 2004/053809 A2 | 6/2004 |

OTHER PUBLICATIONS

PCT International Search Report, based on International Application No. PCT/US03/38570, date of mailing of the International Search Report: Sep. 3, 2004 (3 pages).

Dallas Semiconductor Touch the Future: Automatic Identification, believed to be available by at least Nov. 17, 1997, 12 pages.

Abstract of IT 1261150, 1 page, May 9, 1996.

Non-final Office Action for U.S. Appl. No. 10/898,895, mail date Jun. 14, 2006, 8 pages.

Notice of Allowance for U.S. Appl. No. 10/898,895, mail date Jan. 10, 2007, 4 pages.

* cited by examiner

US 8,031,047 B2

TRAINABLE TRANSCEIVER

CROSS-REFERENCE TO RELATED APPLICATIONS

This application is a Continuation of U.S. patent application Ser. No. 10/898,895, filed Jul. 26, 2004, now U.S. Pat. No. 7,221,256, which is a Continuation-in-Part of U.S. patent application Ser. No. 08/859,130, filed May 20, 1997, now abandoned, and a Continuation-in-Part of International Application No. PCT/US03/38570, filed Dec. 4, 2003, now expired, which claims the benefit of U.S. Patent Application No. 60/431,099 filed Dec. 5, 2002, the entire disclosures of each of these applications, including the specification and drawings, are expressly incorporated herein by reference in their entirety.

BACKGROUND

The present invention relates generally to the field of trainable transceivers for use with vehicles. More specifically, the present invention relates to trainable transceivers that are configured for use with wireless vehicle control systems.

Wireless control systems may be provided in vehicles (e.g., automobiles, cars, trucks, sport utility vehicles (SUVs), minivans, or other vehicles) to provide remote control of vehicle components. Such wireless control systems may be provided with a vehicle as manufactured or may be installed subsequent to vehicle manufacture (e.g., as "aftermarket" components).

One known type of wireless control system is a remote keyless entry ("RKE") system. An RKE system conventionally includes an RKE controller mounted within a vehicle and a transmitter that is carried by a vehicle owner or driver. The RKE controller includes a receiver adapted to receive signals (e.g., radio frequency or "RF" signals) from one or more transmitters. The transmitter may be implemented as a "key fob" device that includes a key ring to which auto, house, and other keys may be attached. RKE transmitters conventionally include a number of buttons that when pressed or activated cause the transmitters to transmit signals to the RKE controller. Upon receipt of such signals, the RKE controller communicates with the appropriate vehicle component to perform a given function. For example, a transmitter may include "door lock," "door unlock," and "trunk open" buttons that when pressed cause the transmitter to transmit signals to the RKE controller. The RKE controller then communicates with a door or trunk lock to perform the desired function.

Conventional RKE systems have RKE controllers that only recognize signals from compatible transmitters. For example, a vehicle manufacturer may provide an RKE system with a vehicle that includes two associated transmitters. The RKE system may be programmed to only recognize signals transmitted at a particular frequency or including a particular data code (e.g., an 8-bit code or rolling code). One difficulty in this arrangement is that if a vehicle owner wishes to add or replace a transmitter, only transmitters compatible with the existing RKE system may be used. Such compatible transmitters may only be available from a limited number of sources, and may prevent the owner from purchasing a relatively inexpensive aftermarket RKE transmitter to use with the existing RKE controller. Use of an aftermarket RKE transmitter instead requires the removal of the existing RKE controller and the installation of an aftermarket RKE controller compatible with the aftermarket transmitter, which may be relatively difficult or expensive for the vehicle owner.

Another difficulty with conventional RKE systems is that if a transmitter is lost or broken, the addition of a new transmitter may require reprogramming of the RKE controller. For example, where two transmitters are provided with an RKE system and one of the transmitters is lost, adding a new transmitter may require that the information stored in the RKE controller memory for both of the transmitters be erased before the new transmitter (and the existing transmitter) signals can be programmed. This may be a relatively complicated procedure that requires intervention by a mechanic or service technician. Such intervention may result in added expense for a vehicle owner.

Yet another difficulty with conventional RKE systems is that RKE controllers may have a limited amount of memory for storing codes, such that only a limited number of controllers (e.g., four) may be used with a particular vehicle. It may be desirable to provide remote access to a greater number of individuals (e.g., for a fleet of vehicles) than can be accomplished using a conventional RKE system.

Yet another difficulty with conventional RKE systems relates to the increasing popularity of such systems. Where an individual has access to a number of vehicles (e.g., a family that has two or more vehicles that are each equipped with RKE systems), multiple transmitters (e.g., key fobs) must be carried with the individual if remote access to each vehicle is desired. Individuals may find this arrangement undesirable, and may instead choose to carry only a transmitter for a primary vehicle (e.g., the vehicle the individual uses most) while using keys for other vehicles.

It would be advantageous to provide a remote control system for a vehicle that is compatible with transmitters from a variety of manufacturers, (e.g., transmitters for different types of vehicles, aftermarket transmitters, etc.). It would also be advantageous to provide a remote control system for a vehicle that is compatible with transmitters emitting signals having a variety of frequencies, data codes, modulations, and the like. It would also be advantageous to provide a remote control system that may be relatively easily programmed to recognize additional transmitters and that does not require intervention by a mechanic or service technician, and/or that does not require deletion of all stored codes before addition of a new transmitter code. It would also be advantageous to provide a remote control system that allows individuals with a single transmitter to remotely control a number of functions for a plurality of vehicles. It would also be advantageous to provide a remote control system that may recognize signals from any number of transmitters. It would also be advantageous to provide a remote control system that allows control of various functions in a vehicle using any of a variety of non-traditional transmitters (e.g., pagers, cellular phones, personal digital assistants, etc.) that may transmit encoded signals (e.g., RF, infrared, Bluetooth, etc.). It would also be advantageous to provide a remote control system that may be used with an existing RKE controller (e.g., by communicating with the existing RKE controller) to provide one or more of the aforementioned advantageous features. Additional advantageous features may become apparent to those of skill in the art reviewing the present disclosure.

SUMMARY

An exemplary embodiment relates to a wireless control system for a vehicle. The wireless control system includes a controller provided in a vehicle for controlling a vehicle component in response to a first signal transmitted from a first wireless transmitter. The wireless control system also includes a transceiver provided in the vehicle for receiving a second signal from a second wireless transmitter. The second signal differs from the first signal. The transceiver is configured to transmit a third signal to the controller in response to the second signal, the third signal emulating at least a portion of the first signal.

Another exemplary embodiment relates to a method of controlling a vehicle system. The method includes receiving a first signal from a first wireless transmitter and in response to the first signal, transmitting a second signal to a controller configured to operate a vehicle system in response to the second signal. The second signal is different from the first signal. The first wireless transmitter may be used to operate the vehicle system without directly transmitting the second signal to the controller.

Another exemplary embodiment relates to a method of programming a vehicle keyless entry system to operate in response to signals received from multiple wireless transmitters. The method includes receiving a first signal from a first wireless transmitter at a transceiver, the first signal configured to cause a controller to actuate vehicle door locks. The method also includes storing at least a portion of the first signal as an emulation signal. The method further includes receiving a second signal from a second wireless transmitter at the transceiver, the second signal being different from the first signal. The method further includes associating the second signal with the emulation signal such that upon receipt of the second signal, the transceiver transmits the emulation signal to the controller to cause the controller to actuate the vehicle door locks.

DETAILED DESCRIPTION OF PREFERRED AND EXEMPLARY EMBODIMENTS

Figure 1:
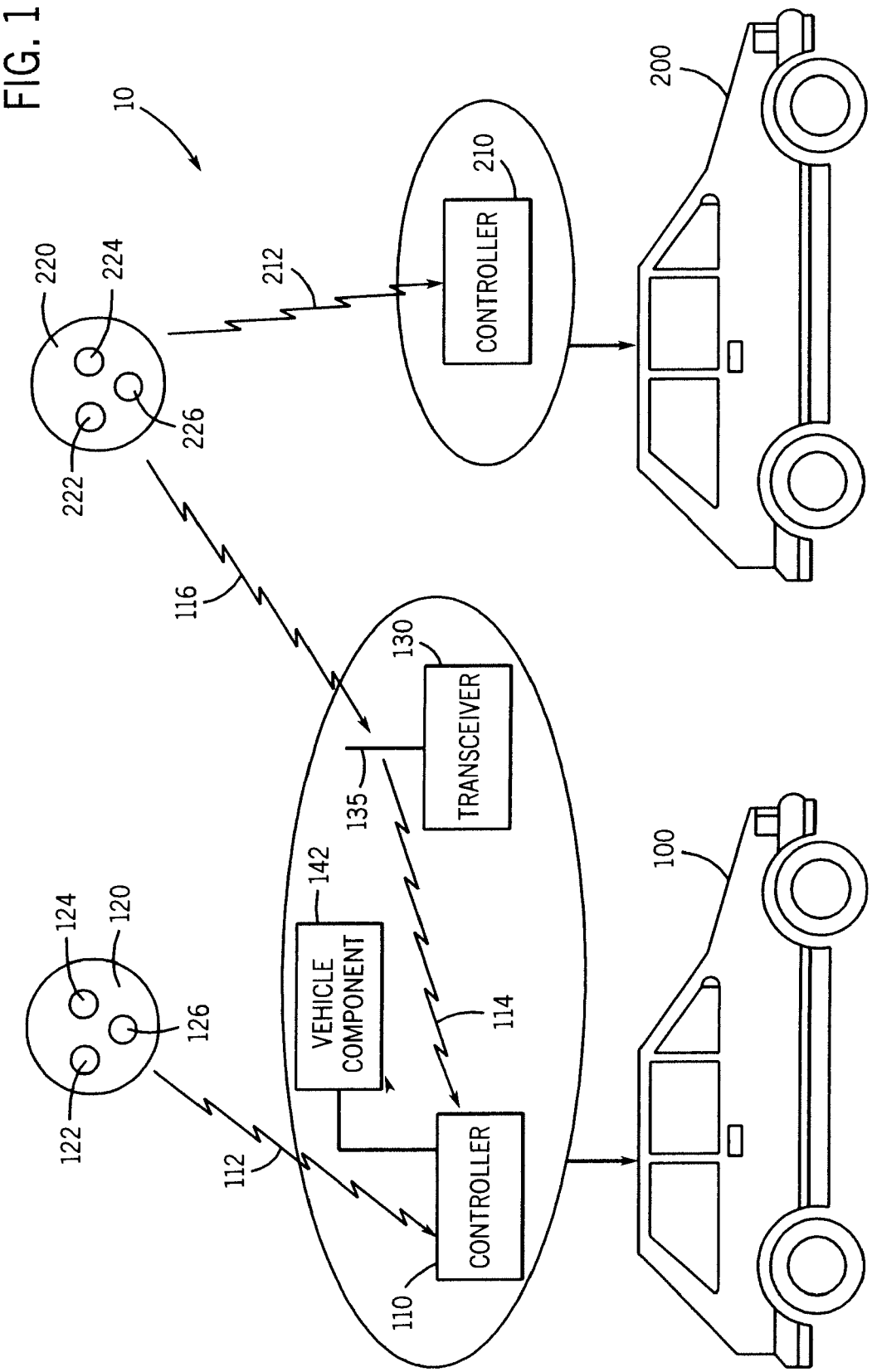
FIG. 1 is a schematic diagram illustrating a wireless system according to an exemplary embodiment.

Referring to FIG. 1, a wireless system 10 is shown according to an exemplary embodiment. A first vehicle 100 (e.g., an automobile, truck, sport utility vehicle (SUV), mini-van, or other vehicle) includes a first controller 110 for controlling one or more functions in vehicle 100. A second vehicle 200 includes a second controller 210 for controlling one or more functions in vehicle 200. Controllers 110 and 210 include receivers for receiving wireless signals from transmitters 120 and 220, respectively.

According to an exemplary embodiment, controllers 110 and 210 are part of remote keyless entry (RKE) systems that are configured to allow users to remotely lock or unlock vehicle doors, trunks, and the like. According to other exemplary embodiments, controllers 110 and 210 may allow users to remotely control a variety of other functions, such as opening or closing windows, sounding a horn, turning on or off lights, flashing lights, adjusting vehicle settings personalized to a particular user (e.g., adjusting seat and mirror position, radio settings, heating and air conditioning systems, etc.), arming/disarming a vehicle security system, or any of a variety of other functions.

A first transmitter 120 is configured to wirelessly transmit signals to controller 110. A number of operator input devices 122, 124, and 126 (e.g., buttons, switches, touch panels, fingerprint or other biometric readers, etc.) are provided on transmitter 120 to allow a user to remotely control various functions provided by controller 110. Each of input devices 122, 124, and 126 are associated with a particular command. When an input device is activated, a signal is wirelessly transmitted (e.g., via radio frequency, infrared, or other wireless frequency) from transmitter 120 to controller 110. For example, according to an exemplary embodiment, input device 122 is associated with an "unlock door" command, input device 124 is associated with a "lock door" command, and input device 126 is associated with an "open trunk" command. A user coming within a predetermined range of vehicle 100 may press any of input devices 122, 124, and 126 to transmit a signal from transmitter 120 to controller 110 representative of the command associated with the selected input device. Controller 110 then receives such signal and controls a vehicle component to perform the appropriate function (e.g., unlocking the doors, etc.), such as by sending a signal to the component by a wired or wireless connection.

A second transmitter 220 wirelessly transmits signals to controller 210 in second vehicle 200. A number of operator input devices 222, 224, and 226 are provided on transmitter 220 to allow a user to control various functions provided by controller 210 (e.g., the controller may control one or more vehicle components similar to the manner described above with respect to controller 110). Transmitter 220 may include functionality similar or identical to that of transmitter 120. According to an exemplary embodiment, transmitter 220 is produced or manufactured by a different manufacturer than transmitter 120, transmits signals at a different frequency than transmitter 120, and/or transmits signals including codes different from those transmitted by transmitter 120. According to this embodiment, controller 110 provided in vehicle 100 is unable to recognize and/or interpret signals transmitted from transmitter 220. According to another exemplary embodiment, controller 110 may be configured to recognize and/or interpret signals from transmitter 220. For example, the transmitter 220 may be produced by the same manufacturer or use similar frequencies and/or codes as the first transmitter 120, such that controller 110 may be adapted for use with the second transmitter 220.

While FIG. 1 shows transmitters 120 and 220 as having three input devices (shown as buttons) associated with three commands, a different number of buttons and/or commands may be provided according to other exemplary embodiments. For example, four or more or fewer than three buttons may be provided. According to another exemplary embodiment, the number of commands that may be produced using a transmitter may differ from the number of buttons provided on the transmitter. For example, two or more input devices may be substantially simultaneously activated to transmit a particular signal to perform a particular function (e.g., pressing buttons 122 and 124 may unlock a vehicle hood). In another example, a sequence of input devices may be activated to transmit a particular signal to perform a particular function. According to yet another exemplary embodiment, the number and/or type of input devices provided on a first transmitter may differ from the number and/or type of input devices provided on a second transmitter. According to still yet another exemplary embodiment, the commands that may be transmitted using a first transmitter may differ from those that may be transmitted using a second transmitter. For example, a first transmitter may include "door lock," "door unlock," and "trunk open" commands, while a second transmitter may include only "door lock" and "door unlock" commands. Other variations are also possible, and the exemplary embodiment shown in FIG. 1 is not presented in limiting fashion.

Transmitters used with system 10 transmit signals having a particular discrete frequency that may be recognized by the controller (or a transceiver, as will be described below). According to an exemplary embodiment, first transmitter 120 and second transmitter 220 transmit signals having frequencies between approximately 200 and 900 kilohertz (kHz). According to a preferred embodiment, at least one of the transmitters transmits signals having a frequency between approximately 315 and 415 kHz.

According to an exemplary embodiment, signals transmitted from first transmitter 120 and/or second transmitter 220 are radio frequency (RF) signals. According to another exemplary embodiment, such RF signals are Bluetooth-compatible signals (i.e., signals compatible with a Bluetooth communications protocol) and the transmitter associated with the signals is a Bluetooth-compatible device. According to this embodiment, a Bluetooth receiver is provided in a controller or a transceiver to receive Bluetooth signals (e.g., a Bluetooth signal could be sent to a transceiver, which in turn transmits an RF signal to an RKE controller, as will be described below). According to various other exemplary embodiments, infrared signals, laser beams, or other types of signals may be used.

Signals emitted by the transmitters 120, 220 also include a data code that identifies the transmitter to a controller (or a transceiver). Such code may also include information representative of an input device activated on the transmitter, which may be interpreted by the controller. The controller may then instruct a vehicle component (e.g., a door lock) to perform a particular function. The data code may be any type of serial encoded message. According to an exemplary embodiment, transmitter 120 and/or transmitter 220 transmit signals having a fixed data code (e.g., an 8-bit data code). According to another exemplary embodiment, transmitter 120 and/or transmitter 220 transmit signals having a "rolling" or changing data code, and/or an encrypted data code. Such rolling code may provide added security in that the transmitter and controller (or transceiver) are configured to utilize a data code that varies between uses. In this manner, it is intended that intercepting and using a particular signal transmitted to a vehicle is made more difficult.

While FIG. 1 shows transmitters 120 and 220 implemented in the form of key fobs, other types of transmitters may also be used. According to other exemplary embodiments, any electronic device capable of transmitting wireless signals to a controller provided in a vehicle may be used as a transmitter (e.g., cellular phones, pagers, personal digital assistants, etc.).

First transmitter 120 is initially configured to transmit signals to first controller 110, and second transmitter 220 is initially configured to transmit signals to second controller 210. To allow second transmitter 220 to transmit signals to first controller 110 to perform functions at first vehicle 100, a trainable transceiver 130 is provided in vehicle 100 according to an exemplary embodiment. According to an another exemplary embodiment, a second trainable transceiver may be provided in second vehicle 200 to allow a transmitter associated with vehicle 100 to transmit signals to a controller provided in vehicle 200. Programming and operation of such second trainable transceiver is accomplished in a manner similar to that described below. According to yet another exemplary embodiment, at least one of the transmitters is an aftermarket transmitter that is not initially associated with a particular vehicle but that a user may wish to associate with one or more vehicles.

Figure 2:
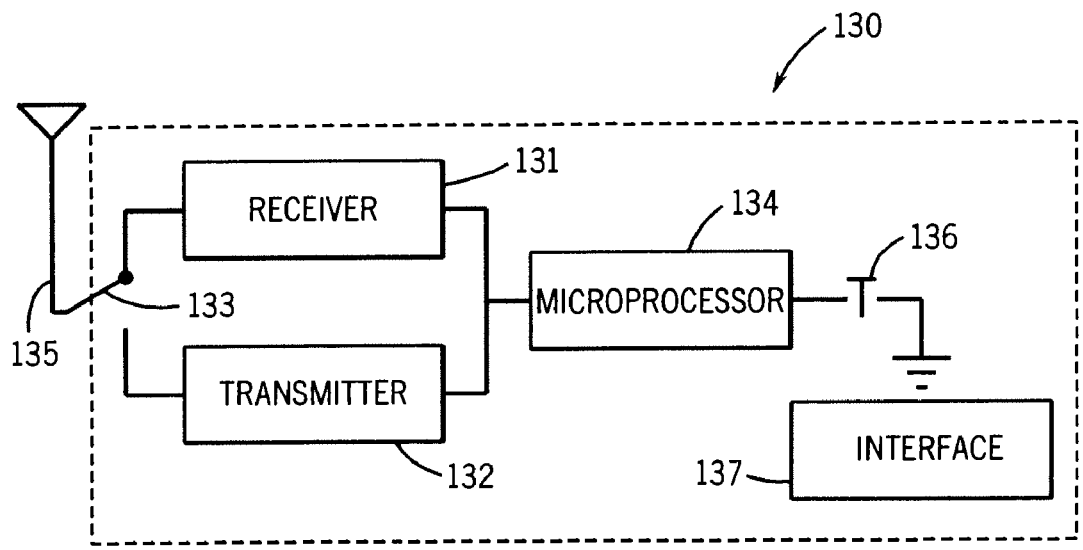
FIG. 2 is a schematic diagram illustrating components of a trainable transceiver included in the wireless system shown in FIG. 1.

FIG. 2 shows a schematic diagram of trainable transceiver 130 according to an exemplary embodiment. Transceiver 130 may be, for example, a HOMELINK® transceiver commercially available from Johnson Controls, Inc. of Holland, Mich. and further configured in one of the exemplary embodiments described below. According to an exemplary embodiment, transceiver 130 includes a receiver 131, a transmitter 132, a transmit/receive switch 133, a microprocessor 134, an antenna 135, at least one actuator switch or button 136, and a vehicle system bus interface 137. Other features and elements may also be provided in the transceiver according to other exemplary embodiments. According to other exemplary embodiments, other types of transceivers may be utilized. According to still other exemplary embodiments, a separate receiver and transmitter may be provided in place of a single dual-function transceiver.

Microprocessor 134 can be a microcontroller, application-specific integrated circuit (ASIC) or other digital and/or analog circuitry configured to perform the functions disclosed herein. In one embodiment, microprocessor 134 includes a memory (e.g., non-volatile memory) configurable with software to perform the functions disclosed herein.

Transceiver 130 may be positioned at any location within the vehicle passenger compartment or elsewhere in vehicle 100. According to an exemplary embodiment, transceiver 130 is provided on a vehicle headliner toward the front or forward portion of a vehicle passenger compartment. According to other exemplary embodiments, the transceiver may be positioned elsewhere in the passenger compartment or vehicle interior (e.g., the visor, instrument panel, overhead compartment, etc.) where a driver and/or passenger may access the transceiver, or may be positioned in a trunk, engine compartment, or other location normally not accessible by a driver and/or passenger.

Transceiver 130 is configured to operate in both a receiving mode and a transmitting mode. As a default condition, transceiver 130 is in the receiving mode. When transceiver 130 receives an incoming signal from a transmitter (such as transmitter 120 or transmitter 220), receiver 131 is configured to receive the incoming signal via antenna 135, demodulate the data code from the signal, and provide the data code to microprocessor 134. Actuator switch 136 may be provided to allow a user to override the default receiving mode to transmit signals to various household devices (e.g., a garage door opener mechanism, a home lighting system, etc.) in accordance with other features provided by transceiver 130. According to an exemplary embodiment, a plurality of actuator switches may be provided such that each actuator switch is associated with a different channel or command for which the transceiver may transmit a signal to a garage door opener, lighting system, or the like.

Transceiver 130 may be trained or programmed when in the receiving mode. To activate the training or programming mode, an actuator switch (e.g., actuator switch 136) is depressed for a predetermined amount of time (e.g., 3 seconds). The training mode allows the user to program signals from a transmitter (e.g., transmitter 120 or 220) into the transceiver memory. A transmitter is brought in the vicinity of transceiver 130 and an input device on the transmitter is activated to send a signal to transceiver 130, which decodes and stores information related to the received signal (e.g., frequency, modulation, data code, etc.).

To identify the carrier frequency of the received signal and to separate and store the transmitted data code, microprocessor 134 controls a voltage controlled oscillator (VCO) in transmitter 132 to generate a reference signal that is mixed with the received signal. The resulting mixed signal is provided to a bandpass filter that passes a demodulated signal through to microprocessor 134 when the difference between the frequency of the reference signal and the carrier frequency of the received signal is 3 MHz. Microprocessor 134 controls the VCO to increment the frequency of the reference signal by 1 MHz until microprocessor 134 detects and verifies the presence of data. Microprocessor 134 then verifies the carrier frequency of the received signal by increasing the frequency of the reference signal by 3 MHz to determine if the data is no longer present, and then increasing the frequency of reference signal by another 3 MHz to determine if the data can again be detected. After verifying the carrier frequency of the received signal, microprocessor 134 stores the carrier frequency and the data code of the received signal and notifies the user of a successful train (e.g., by beeping or providing some other signal). According to other exemplary embodiments, other methods of training microprocessor 134 to learn a carrier frequency of a signal transmitted by transmitters 120 or 220 may be used. For example, microprocessor 134 can maintain a library of commonly-used or predetermined frequencies and check to see if the incoming signal matches any of the predetermined frequencies.

First transmitter 120 is configured to transmit a signal 112 directly to controller 110. Controller 110 in turn recognizes signal 112 and instructs a vehicle component 142 (e.g., a door lock, etc.) to perform a function associated with such signal. Similarly, second transmitter 220 is configured to transmit a signal 212 to second controller 210 in vehicle 200.

To allow second transmitter 220 to transmit a signal to controller 110 in first vehicle 100, transceiver 130 is programmed to send a signal to controller 110 to activate vehicle component 142 (e.g., by emulating or mimicking the signal 112 from first transmitter 120 or by sending a signal different than signal 112 to which controller 110 is responsive). Upon receipt of a signal from second transmitter 220, transceiver 130 compares the signal to known signals and identifies that the received signal corresponds to a pre-stored or predetermined signal. A signal is then sent from transceiver 130 to controller 110 using transmitter 132 (FIG. 2) and antenna 135. Controller 110 receives the signal from transceiver 130 and actuates vehicle component 142. According to an exemplary embodiment, the transceiver communicates with the controller using a wired communications link (e.g., the transceiver receives a signal from a controller and then communicates with the controller over a wired connection to actuate a vehicle component).

Figure 3:
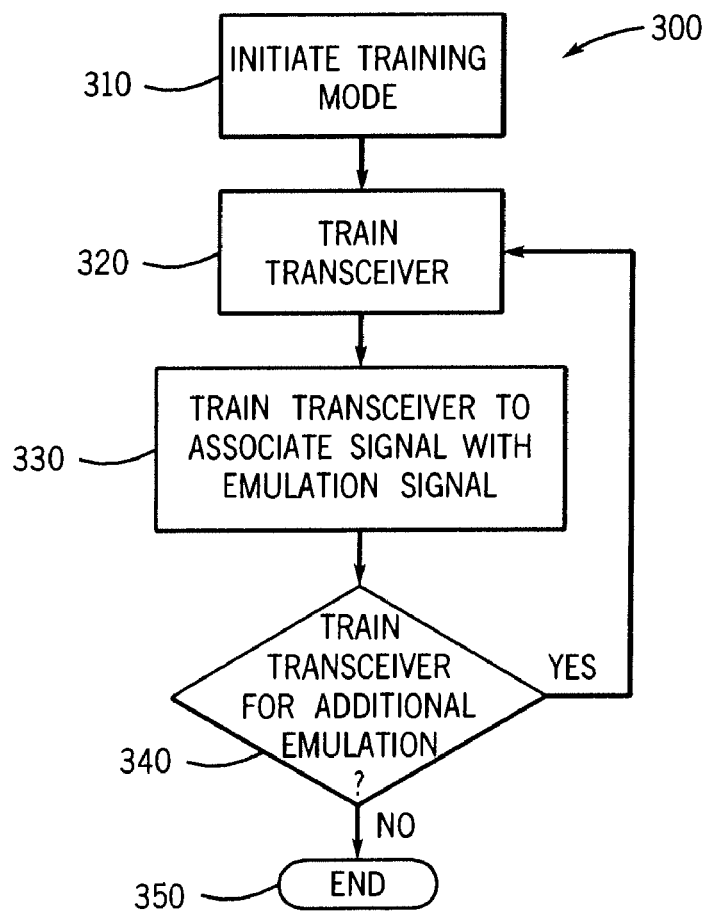
FIG. 3 is a flow diagram illustrating a method of programming a trainable transceiver according to an exemplary embodiment.

FIG. 3 is a flow diagram illustrating a method 300 of programming trainable transceiver 130 according to an exemplary embodiment. In a step 310, a training mode is initiated by depressing actuator switch 136 or by any other acceptable method.

In a step 320, transceiver 130 is trained to emulate at least a portion of signal 112 received from first transmitter 120. A first input device (e.g., one of buttons 122, 124, and 126) on first transmitter 120 is activated to transmit signal 112 to transceiver 130. Microprocessor 134 decodes the incoming signal and stores the representative information (e.g., frequency, data code, modulation type, and/or bitrate, etc.) in memory as an emulation signal 114. Such emulation signal may then be associated with a corresponding signal received from another transmitter (e.g., transmitter 220). According to an exemplary embodiment, emulation signal 114 exactly emulates signal 112 (e.g., bit rate, modulation type, error correction scheme, frequency, data code, etc.). According to another exemplary embodiment, the emulation signal emulates a portion of signal 112 (e.g., frequency and data code only, etc.). According to another exemplary embodiment, the emulation signal is entirely different from signal 112 (e.g., the controller recognizes that the emulation code should be interpreted as if signal 112 had been received, even though the emulation signal differs from signal 112).

In a step 330, transceiver 130 is trained to associate a signal 116 from second transmitter 220 with emulation signal 114. One of input devices 222, 224, and 226 is activated to send signal 116 to transceiver 130. Microprocessor 134 decodes the incoming signal and stores the representative information in memory and associates signal 116 with emulation signal 114. When transceiver 130 is returned to the receiving mode, receipt of a signal 116 from second transmitter 220 causes transceiver 130 to wirelessly transmit emulation signal 114 to controller 110. Because emulation signal 114 mimics signal 112 or is otherwise recognized by controller 110, receipt of emulation signal 114 causes controller 110 to perform the function associated with signal 112. Controller 110 acts in the same manner as if signal 112 had been transmitted to controller 110 from first transmitter 120. Transceiver 130 thus emulates the transmission of a signal from first transmitter 120 in response to a different signal received from second transmitter 220.

A decision step is presented in step 340 to allow a user to train or program transceiver 130 to recognize another signal from transmitter 220 (or from another transmitter) to emulate another signal provided by transmitter 120. If further training is desired, steps 320 and 330 may be repeated until the desired programming is complete. If no further training is desired, transceiver 130 returns to operational mode in which transceiver 130 is configured to receive signals from a transmitter (e.g., transmitter 220) and in response send an emulation signal to controller 110.

While the method 300 of training transceiver 130 has been described with reference to a particular exemplary embodiment, other programming methods may be used. According to another exemplary embodiment, a signal from a second transmitter (e.g., the signal that is received and transformed or converted to an emulation signal by the transceiver) may be transmitted to the transceiver prior to transmission of a signal from a first transmitter (i.e., the signal that is emulated by the transceiver).

According to another exemplary embodiment, more than one signal may be sent from a first transmitter before transmission of signals from a second transmitter. For example, three signals from a first transmitter may be received by the transceiver (which stores them as emulation signals), after which three signals from a second transmitter are received. The first signal transmitted from the second transmitter is associated with the first emulation signal, the second signal from the second transmitter is associated with the second emulation signal, and the third signal from the second transmitter is associated with the third emulation signal. Any number of signals from the first transmitter may be transmitted prior to transmission of signals by the second transmitter.

According to yet another exemplary embodiment, the training mode may be discontinuous. For example, the transceiver may be programmed with a plurality of signals (e.g., in a particular sequence) to emulate signals from the first transmitter (e.g., signal 1 represents the "unlock doors" signal, signal 2 represents the "lock doors" signal, and signal 3 represents the "unlock trunk" signal). A user may later (e.g., hours, days, or weeks later, etc.) wish to associate signals from a second transmitter with the emulation signals preprogrammed into the transceiver. The training mode may then be activated, after which the user could transmit signals from the second transmitter to the transceiver. The signals from the second transmitter are then automatically associated with a corresponding emulation signal in the order the emulation signals were originally programmed into the transceiver.

According to still yet another exemplary embodiment, various buttons or switches included in a vehicle-mounted controller may be associated with various emulation signals programmed into a transceiver (e.g., a first button is associated with a first emulation signal corresponding to a first signal received from a first transmitter). To program the transceiver to emulate a particular signal in response to the receipt of a different signal from a second transmitter, the button associated with a particular emulation signal is pressed by a user, after which the user may press a corresponding button on the second transmitter to transmit a signal to the transceiver. In this manner, a number of emulation signals may be programmed into the transceiver and subsequently associated with signals from a second transmitter without regard to the order the emulation signals were programmed into the transceiver. Other methods of training or programming the transceiver to emulate signals from a first transmitter upon receipt of signals received from a second transmitter may be used according to other exemplary embodiments without departing from the scope of the inventions as described herein.

While the above description refers only to the use of first and second transmitters, additional transmitters may also be provided. For example, where signals from a first transmitter are emulated by a transceiver, signals from both a second and third transmitter may be received by the transceiver (which in turn sends emulation signals to the controller). Thus, a single emulation signal programmed into the transceiver may be associated with a signal from both the second transmitter and the third transmitter (and other transmitters if the transceiver is so trained). One advantageous feature of such an arrangement is that multiple additional users (e.g., members of a family) having transmitters for different vehicles may each provide signals to a controller of a particular vehicle without having to carry a transmitter for each vehicle. Any number of transmitters may be used according to other exemplary embodiments.

The signal transmitted from the second transmitter may or may not correspond in function to the emulation signal transmitted by the transceiver. According to an exemplary embodiment, the emulation signal and the signal from the second transmitter correspond in function. For example, a "lock doors" emulation signal programmed into the transceiver may correspond to a "lock doors" signal received from a second transmitter. According to another exemplary embodiment, an emulation signal and a signal from a second transmitter associated with the emulation signal have different functions. For example, a "lock doors" emulation signal may correspond to an "unlock doors" signal received from the second transmitter.

According to another exemplary embodiment, signals from two input devices on a second transceiver may trigger the transceiver to send the same emulation signal to the first controller (e.g., pressing both the "unlock doors" and "unlock trunk" buttons on the second transmitter may cause the transceiver to send an "unlock doors" emulation signal to a controller).

In operational mode, transceiver 130 emulates signals from a transmitter associated with vehicle 100 in response to a signal from transmitter 220 (or another transmitter not associated with vehicle 100). Microprocessor 134 periodically checks whether an RF signal has been received from a transmitter. To determine whether an RF signal has been received, microprocessor 134 scans a range of frequencies to identify an incoming signal. According to another exemplary embodiment, microprocessor 134 tunes receiver 131 to a signal having a known frequency and awaits an incoming signal. Once a signal is received, microprocessor 134 compares the received data to the predetermined data code associated with known transmitters and wirelessly transmits an appropriate emulation signal to controller 110 after determining that the received data code is the same as that previously stored in microprocessor 134 and associated with a particular emulation signal.

It is important to note that the construction and arrangement of the elements shown and described is illustrative only. Although only a few embodiments have been described in detail in this disclosure, those skilled in the art who review this disclosure will readily appreciate that many modifications are possible without materially departing from the novel teachings and advantages of the subject matter recited herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may be made in the design, operating conditions and arrangement of the preferred and other exemplary embodiments without departing from the scope of the present invention.

What is claimed is:

1. A wireless control system for a vehicle comprising:
    a controller provided in a vehicle for controlling a vehicle component in response to a first signal transmitted from a first wireless transmitter; and
    a transceiver provided in the vehicle and configured to associate, during a training process, at least a portion of the first signal with a signal received from a second wireless transmitter;
    wherein the transceiver is further configured to receive a second signal from the second wireless transmitter, the second signal differing from the first signal;
    wherein the transceiver is configured to transmit a third signal to the controller in response to the second signal based on the association learned during the training process, the third signal emulating at least the portion of the first signal.

2. The wireless control system of claim 1, wherein the controller is configured to control the vehicle component in response to the third signal.

3. The wireless control system of claim 1, wherein the transceiver transmits the third signal via a wired communication link.

4. The wireless control system of claim 1, wherein the transceiver transmits the third signal via a wireless communication link.

5. The wireless control system of claim 1, wherein the third signal is identical to the first signal.

6. The wireless control system of claim 1, wherein the third signal includes at least a portion of a data code included in the first signal.

7. The wireless control system of claim 1, wherein the first signal and the second signal have at least one of different data codes and different carrier frequencies.

8. The wireless control system of claim 1, wherein the transceiver is programmed to associate the second signal with the third signal such that the third signal is transmitted in response to the second signal.

9. The wireless control system of claim 1, wherein the transceiver is configured to transmit the third signal in response to a fourth signal transmitted from a third transmitter, the fourth signal being different from the first signal and the second signal.

10. The wireless control system of claim 1, wherein the first transmitter and the second transmitter provide remote keyless entry signals.

11. The wireless control system of claim 1, wherein the first signal and the second signal are transmitted as one of radio frequency signals, Bluetooth-compatible signals, infrared signals, and laser beams.

12. The wireless control system of claim 1, wherein the transceiver is provided in a passenger compartment of the vehicle.

13. The wireless control system of claim 1, wherein first wireless transmitter and the second wireless transmitter are produced by different manufacturers.

14. The wireless control system of claim 1, wherein the vehicle component is selected from a remote keyless entry system, a window, a horn, a light, a radio, a seat, a mirror, an air conditioning system, and a vehicle security system.

15. A method of controlling a vehicle system comprising:
receiving a first signal from a first wireless transmitter;
associating the first signal with a signal from a second wireless transmitter during a training process; and
in response to the first signal, transmitting a second signal to a controller configured to operate a vehicle system in response to the second signal, the second signal being different from the first signal;
whereby the first wireless transmitter may be used to operate the vehicle system without directly transmitting the second signal to the controller;
wherein the second signal emulates at least a portion of a third signal that may be transmitted from the second wireless transmitter, the third signal being different from the first signal.

16. The method of claim 15, wherein the controller is also configured to actuate the vehicle system in response to the third signal.

17. The method of claim 15, wherein the second signal emulates the entire third signal.

18. The method of claim 15, wherein the first and third signals have at least one of different data codes and different carrier frequencies.

19. The method of claim 15, wherein at least one of the first wireless transmitter and the second wireless transmitter are selected from a pager, a cellular phone, and a personal digital assistant.

20. The method of claim 15, wherein the second signal is transmitted to the controller over a wired connection.

21. The method of claim 15, wherein the second signal is transmitted to the controller over a wireless connection.

22. The method of claim 15, wherein the vehicle system comprises at least one of a remote keyless entry system, a window, a horn, a light, a radio, a seat, a mirror, an air conditioning system, and a vehicle security system.

23. A method of programming a vehicle keyless entry system to operate in response to signals received from multiple wireless transmitters, the method comprising:
receiving a first signal from a first wireless transmitter at a transceiver, the first signal configured to cause a controller to actuate vehicle door locks;
storing at least a portion of the first signal as an emulation signal;
receiving a second signal from a second wireless transmitter at the transceiver, the second signal being different from the first signal; and
associating the second signal with the emulation signal such that upon receipt of the second signal, the transceiver transmits the emulation signal to the controller to cause the controller to actuate the vehicle door locks.

24. The method of claim 23, wherein the first wireless transmitter is associated with a first vehicle and the second wireless transmitter is associated with a second vehicle.

25. The method of claim 23, wherein the emulation signal is transmitted via a wireless connection to the controller.

26. The method of claim 23, wherein the emulation signal is transmitted via a wired connection to the controller.

27. The method of claim 23, wherein the first signal and the second signal have different data codes.

28. The method of claim 23, wherein the first signal and the second signal have different carrier frequencies.

29. The method of claim 23, wherein the emulation signal is identical to the first signal.

30. The method of claim 23, wherein the transceiver is provided in a vehicle passenger compartment.

* * * * *